H. L. SHEPLER.
UPHOLSTERY MOUNTING.
APPLICATION FILED MAR. 1, 1915.
1,298,803.
Patented Apr. 1, 1919.
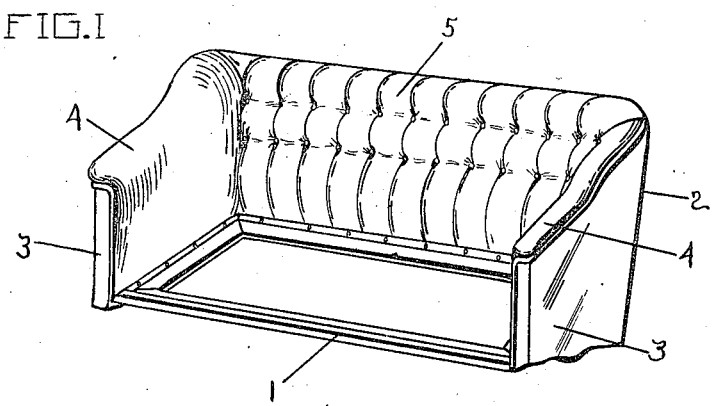
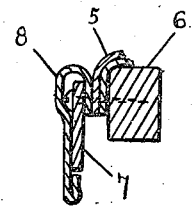
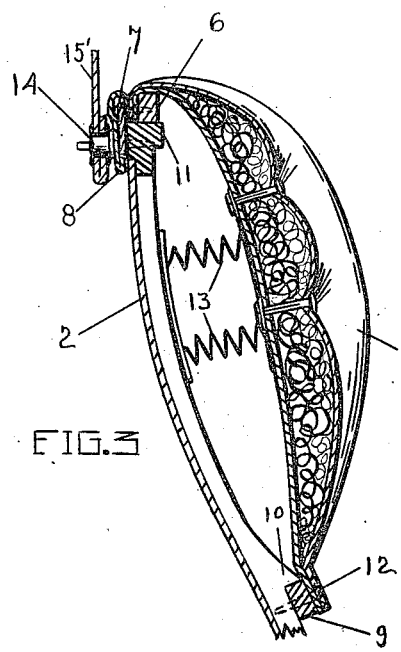
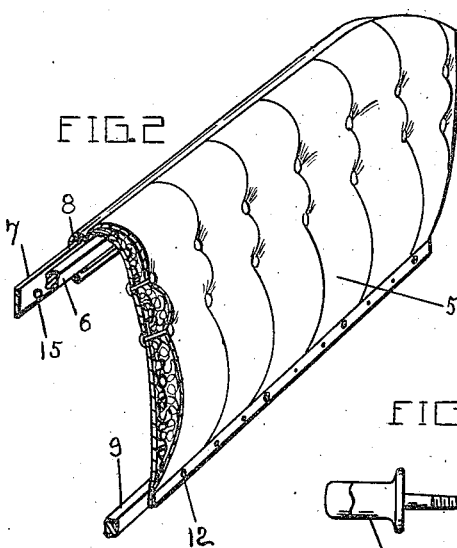
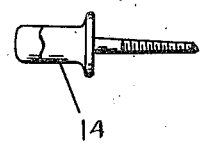
Harry L. Shepler
Inventor
By Geo E Kirk
Attorney
Witnesses
Gladys Jameson
C. H. Rauch

UNITED STATES PATENT OFFICE.

HARRY L. SHEPLER, OF TOLEDO, OHIO, ASSIGNOR TO THE WILLYS-OVERLAND COMPANY, OF TOLEDO, OHIO, A CORPORATION OF OHIO.

UPHOLSTERY-MOUNTING.

1,298,803.

Specification of Letters Patent.

Patented Apr. 1, 1919.

Application filed March 1, 1915. Serial No. 11,128.

*To all whom it may concern:*

Be it known that I, HARRY L. SHEPLER, a citizen of the United States, residing at Toledo, Lucas county, Ohio, have invented new and useful Upholstery-Mountings, of which the following is a specification.

This invention relates to upholstery devices and means for facilitating the handling thereof.

The object of my invention is to provide an improved upholstery construction for seat backs and similar uses, which will permit of the rapid and convenient installation and removal of the upholstering cushions with reference to the seat frame of the motor vehicle body.

Further objects and objects relating to economy of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawings forming a part of this specification, in which:

Referring to the drawings:

Figure 1 is a perspective fragmentary view of a vehicle seat having an upholstery device incorporated therewith;

Fig. 2 is a fragmentary perspective view showing a section of the seat back device of Fig. 1;

Fig. 3 is a section through the seat back device and its mountings;

Fig. 4 is an enlarged detail of the upper mounting bar and strip feature of the upholstery device; and Fig. 5 is a detail of the curtain fastener herein adopted as a holder and mounting for the upholstery device.

The seat 1 is provided with the back 2 and arms 3 having upholstery devices 4. Independent of these upholstery devices 4 is the seat back upholstery device 5 of tufted material bound and fully formed independently of its hanging in the seat 1. This tufted upholstery device 5 has the upper tacking strip 6 to which is tacked or firmly secured the metal strip 7 over which a skirting 8 of flexible material extends. Independently movable as to the upper tacking strip 6 is the approximately parallel lower tacking strip 9.

In hanging the upholstery device, or assembling the seat back in a seat, the seat is provided with the lower ledge means 10 to engage the strip 9 and upper ledge means 11 against which may rest the strip 6 and back of which may engage the metal strip 7. These opposing ledges 10, 11, serve to distend the flexible upholstery device 5 and readily give it shape.

The removable holding means or screws 12 may serve to maintain the strip 9 in position with the device 5 distended by the springs 13, while the screw curtain fasteners or holding means 14 may pass through openings 15 provided therefor in the strip 7 and enter the ledge 11 to hold the upper bar 6 against displacement in the hanging of the upholstery device 5. These holding means 14 may coact to maintain curtains 15′ in position.

In the working of material through a plant, especially bulky structures, as automobile bodies, the item of time in assembling as well as the floor space therefor is material. It is possible always to work more rapidly and more cheaply at machines and with the complete forming of the upholstery devices at the machine, the assembly thereof with the body may occur simultaneously with other assembling operations, and thereby practically eliminate any time delay in connection with putting material through the process of manufacture.

The upholstery device herein disclosed retains its shape upon the bars 9 and 6, 7; is quickly snapped into position as to a seat back; may be assembled and so anchored by the holding means 12, 14; and the minimizing of time in manufacture is further emphasized in that the holding devices 14 have the dual function of also providing holding means for the curtains.

What is claimed and it is desired to secure by Letters Patent is:

1. In a seat back, the combination of a seat back panel, having an upper frame member; an upholstering cushion having a tacking strip secured along the upper edge thereof; a bar secured to said tacking strip and to said upper frame members; and a flexible strip extending from said cushion over said bar and concealing the same.

2. In a seat back, the combination of a seat back panel, having an upper frame member, extending along the upper edge thereof; an upholstering cushion having an upper tacking strip, extending along the upper edge thereof; and a bar secured to said upper tacking strip and removably secured to said upper frame member.

3. An upholstery device, a mounting bar therefor, and a metal strip attached to the bar, said device having a skirting extending over the strip and engaging between the bar and strip.

In testimony whereof I affix my signature in the presence of two witnesses.

HARRY L. SHEPLER.

Witnesses:
H. H. GOODALL,
GEO. E. KIRK.